United States Patent
Ohnishi

[11] 3,759,051
[45] Sept. 18, 1973

[54] DUAL COMPARTMENT-TEMPERATURE REFRIGERATOR WITH POSITIVE INTERNAL AIR CIRCULATION

[75] Inventor: Hiroshi Ohnishi, Higashi Sumiyoshi-ku, Osaka, Japan

[73] Assignee: Tokyo Shibaura Electric Co., Kawasaki-shi, Japan

[22] Filed: Aug. 3, 1971

[21] Appl. No.: 168,628

[30] Foreign Application Priority Data
Aug. 4, 1970 Japan.............................. 45/77911
July 23, 1971 Japan.............................. 46/55057

[52] U.S. Cl.................................. 62/180, 62/419
[51] Int. Cl............................................ F25d 17/00
[58] Field of Search.................. 62/180, 186, 419, 62/208, 209; 318/138, 254, 472

[56] References Cited
UNITED STATES PATENTS
| | | | |
|---|---|---|---|
| 3,117,429 | 1/1964 | Harley, Jr. et al. | 62/419 |
| 3,427,818 | 2/1969 | Erickson | 62/209 |
| 3,600,658 | 8/1971 | Kuniyoshi | 318/138 |
| 3,667,019 | 5/1972 | Elliott et al. | 318/138 |

*Primary Examiner*—Meyer Perlin
*Assistant Examiner*—Paul Devinsky
*Attorney*—Kemon et al.

[57] ABSTRACT

In a refrigerator of the type having freezing and cold storage compartments and a fan for positive circulation of air over the evaporator and through the compartment, the efficiency of operation is marketly improved by utilizing as a drive motor for the fan, a variable speed brushless D.C. type motor with the greater portion of the speed and commutator control circuits arranged exteriorally of the refrigerated compartment.

3 Claims, 5 Drawing Figures

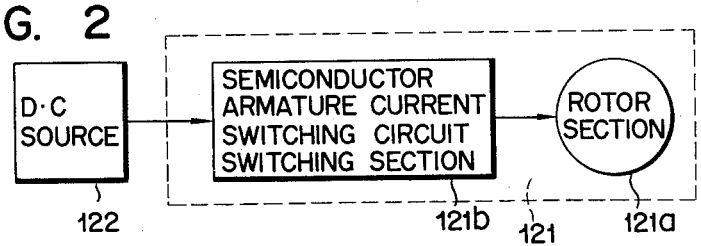
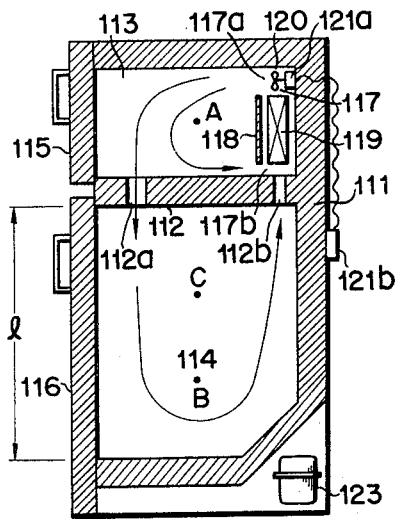
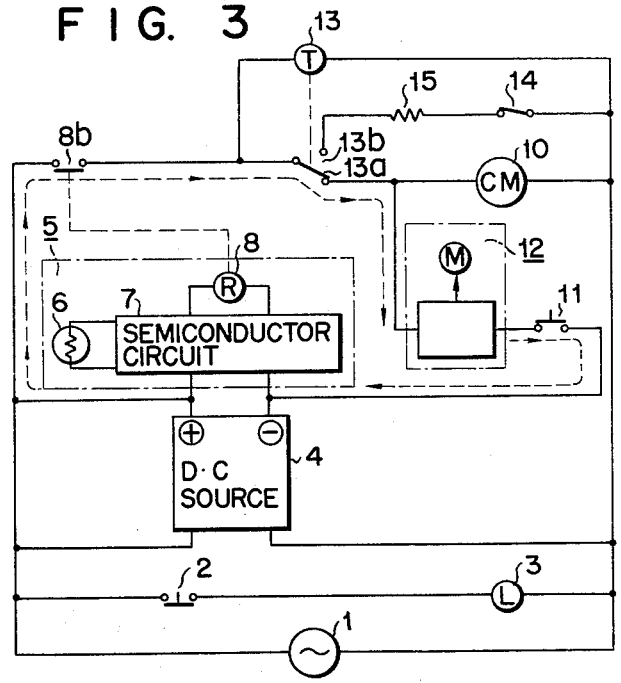
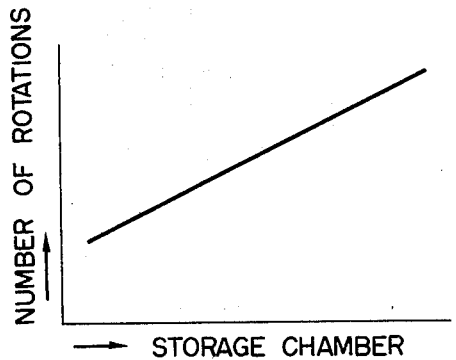

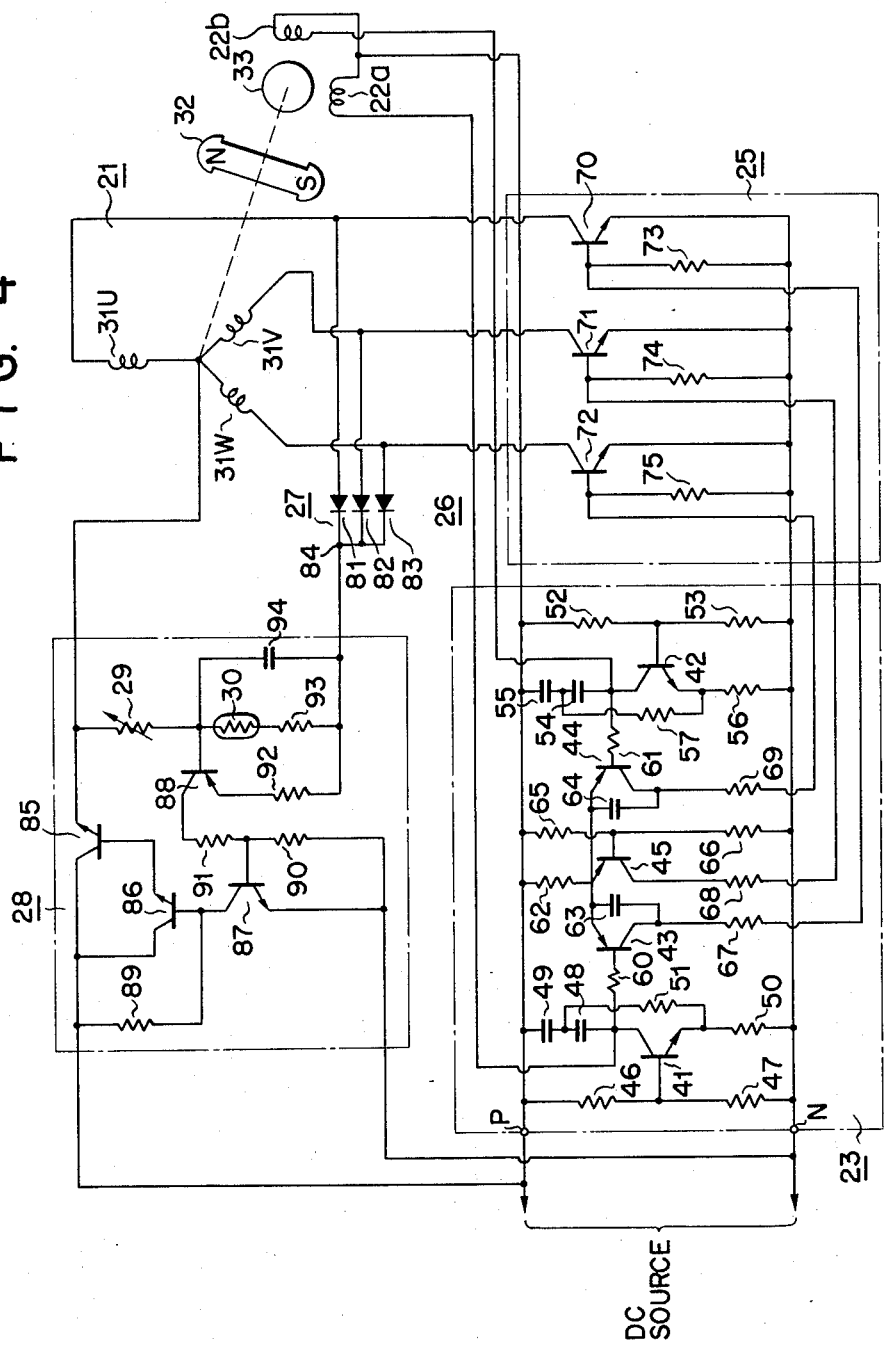

DUAL COMPARTMENT-TEMPERATURE REFRIGERATOR WITH POSITIVE INTERNAL AIR CIRCULATION

BACKGROUND OF THE INVENTION

This invention relates to a refrigerator using a brushless motor to drive a fan for circulating cold air through the refrigerator to cool its interior.

With a conventional refrigerator of the aforementioned type, there has often been used a shading coil induction motor for the reason that a fan-driving motor is desired to be inexpensive and that the power source of a refrigerator is generally of single phase A.C. type. However, said shading coil induction motor displays an extremely low efficiency only corresponding to about 10 percent of the input. For example, where a necessary load for rotation of a fan is of the order of one watt, then there should be used a motor requiring an input of ten watts. Therefore, about nine watts as the remainder is wasted as heat loss in the refrigerator. To compensate for such heat loss, it has heretofore been necessary to use a large capacity refrigeration compressor. This makes the adoption of an inexpensive shading coil induction motor quite meaningless and eventually leads to considerably uneconomical results.

SUMMARY OF THE INVENTION

It is accordingly the object of this invention to provide a refrigerator offering the advantage of reducing power consumption due to a brushless motor being used to drive a fan disposed in the refrigerator and fully serving the purpose even with a small capacity refrigeration compressor.

A refrigerator according to this invention is provided with a rotation speed control circuit which can maintain, regardless of variations in the source voltage, the prescribed rotation speed of a brushless motor driving a fan for circulating cold air forcefully through the storage chamber; detect changes in the storage chamber temperature thereby automatically to control the fan rotation; and in summer effect rapid cooling through manual operation. Further, this invention can provide a refrigerator having prominent waterproofness and consequently durability by disposing the rotor section of said brushless motor in the refrigerator and arranging a rotation speed control circuit consisting of semiconductor elements outside thereof.

BRIEF DESCRIPTION OF THE DRAWINGS

FIG. 1 is an elevational sectional view of a refrigerator according to this invention;

FIG. 2 is a block diagram of the electrical system of the embodiment of FIG. 1;

FIG. 3 is a circuit diagram of said embodiment;

FIG. 4 is a circuit diagram associated with a brushless motor used in said embodiment; and FIG. 5 shows the relationship of temperature within the storage chamber and the number of rotations of the brushless motor.

DETAILED DESCRIPTION OF THE INVENTION

The brushless motor is generally known as a thyristor motor, transistor motor or semiconductor motor, and has as extremely high an efficiency as about 50 percent. Therefore, assuming that there is required 1 watt as a fan load, an input of only 2 watts will be sufficient, with heat loss prominently reduced to about 1 watt, namely, to a substantially negligible extent as compared with the motor of a prior art refrigerator. Accordingly, the refrigerator of this invention using such brushless motor permits the use of a compressor reduced in refregeration capacity to an extent equal to the decreased heat loss and offers great economy due to smaller power consumption.

This invention has been accomplished in view of the above-mentioned advantages. There will now be described an embodiment of the invention by reference to the appended drawings. Referring to FIG. 1, numeral 111 represents a refrigerator open at the front, and there is a cooling chamber, for example, refrigeration and storage chambers. The interior is divided into upper and lower regions by a partition wall 112. The upper region constitutes the refrigeration chamber 113 and the lower region the cold storage chamber 114. The openings of both chambers 113 and 114 are fitted with doors 115 and 116 capable of being closed airtight. Numeral 117 denotes a duct defined between the inner wall and partition plate 118 of the refrigeration chamber 113. At the top of the duct 117 is provided a cold air delivery port 117a and at the bottom a cold air suction part 117b. In the duct 117 is disposed an evaporator 119 of a refrigerating system. Above the evaporator 119 is positioned a fan 120 so as to face the cold air delivery port 117a. Said fan 120 is driven by a brushless motor 121, which consists, as shown in FIG. 2, of a rotor section 121a and semiconductor armature current switching circuit 121b. The rotor section 121a is a sort of D.C. magnet motor comprising an armature provided with the same polyphase winding as in a synchronous motor and a magnet for rotating about the armature so as to create the same rotating magnetic field as in the synchronous motor. The semiconductor armature current switching circuit 121b switches by means of semiconductor element, for example, a thyristor the current introduced through an armature of polyphase winding from a D.C. source 122 successively according to the position of a rotating magnetic field so as to attract it in the prescribed direction of rotation. Said D.C. power source 122 may consist of a rectifier for the full-wave rectification and smoothing of current derived from a single phase source such as about 100 volt generally used in a refrigerator. The rotating section 121a is received in a refrigeration chamber, for example, above the duct 117, and the switching circuit 121b is placed outside of the refrigerator, for example, on its backside. The D.C. source 122 may be provided integrally with the switching circuit 121b or separately therefrom, for example, at the bottom, top and front of the refrigerator 111. Referring to FIG. 1, numerals 112a and 112b are cold air passages formed in the partition wall 112, and numeral 123 denotes the compressor of the refrigerating system.

Now let it be assumed that the compressor 123 is operated to cool the evaporator 119 and the brushless motor is driven by direct current from the D.C. source 122 to rotate the fan 120. Then cold air from the evaporator 119 is conducted by the fan 120 from the delivery port 117a to the refrigeration chamber 113 to freeze it. Part of the cold air is circulated, as shown in FIG. 1, through the refrigeration chamber 113 and carried into the duct 117 through the suction port 117b. The remainder of the cold air is delivered into the cold storage chamber 114 through one cold air passage 112a and after being circulated through said cold storage chamber 114, is brought back to the duct 117 through the other cold air passage 112b. Repetition of the aforementioned operation keeps the refrigeration and cold storage chambers 113 and 114 at a prescribed temperature. The brushless motor 121 is, as previously described, a D.C. magnetic motor using a semiconductor switching circuit without a brush and commutator and attains an efficiency of about 50 percent. With, therefore, the required load of the fan 120 represented by 1 (w), an input of 2(w) will be sufficient. The heat loss is noticeably reduced to about 1(w) as has been impossible with a prior art refrigerator motor. Since the semiconductor armature current switching circuit 121b is disposed outside of a refrigerator, heat loss occurring therein decreases, enabling heat load to be reduced to a substantially negligible extent as compared with a conventional refrigerator motor. This means that there can be used a compressor reduced in refrigerating capacity to an extent equal to the decreased heat load, thus reducing power consumption and offering great economy. There were experimentally obtained data indicating that in the case of a refrigerator having an inner volume of 120 to 180 liters, it was possible to use a compressor whose capacity could be 15 to 20 percent smaller than in a prior art refrigerator. Further, the refrigerator of this invention is operated by the brushless motor 121, that is, direct current and consequently is not affected by changes as 50 to 60 Hz or reversely in the frequency of a power source used, offering the advantage of stabilizing a refrigerating capacity.

The following table compares the temperature attained by a refrigerator using the conventional shading coil induction motor with that by a refrigerator provided with a brushless motor according to this invention.

| Fan motor cycle points where temperature was determined | Shading coil induction motor 60 Hz | Brushless motor 60 Hz |
| --- | --- | --- |
| A. Above freezer | −23.0 °C | −25.0 °C |
| B. Below freezer | −23.0 °C | −25.0 °C |
| C. 1/3l from the bottom surface | −5.5 °C | −9.5 °C |
| D. 2/3l from the bottom surface of the storage chamber | −3.5 °C | −8.0 °C |

The above table shows that while there was previously consumed energy of 177.5 (w) per unit time at 60 Hz, this invention reduces power requirement to 165.0 (w), enabling a compressor to have a smaller capacity by that extent.

There will now be described by reference to FIG. 3 the arrangement and function of an electrical circuit used in a refrigerator according to this invention. Referring to FIG. 3, there is connected to an A.C. source 1 a refrigerator lamp 3 through a door switch 2 and also a D.C. source circuit 4. This circuit 4 supplies direct current to the later described thermostat 5 and brushless motor 12. To said circuit is connected the thermostat 5 for detecting temperature in the refrigerator. This thermostat 5 is generally known as a semiconductor thermostat and comprises, for example, a thermistor 6 for detecting refrigerator temperature; a semiconductor circuit 7 mainly consisting of a semiconductor switching element, for example, a transistor actuated by change in the resistance of said thermistor 6; and a relay 8 energized by output signals from said semiconductor circuit 7. Where the storage chamber temperature becomes higher than a preset level, the relay 8 is brought to a deenergized state. Where the storage chamber temperature falls to below said level, the relay 8 is energized. To the A.C. source 1 is connected a compressor motor 10 through the normally closed contact 8b of the relay 8 included in the thermostat 5 and the contact 13a of the later described defrosting timer 13 connected in series. Said compressor motor 10 drives a compressor for circulating a refrigerant through the evaporator 119. To the output terminal of the A.C. source circuit 4 is connected the brushless motor 12 through the normally closed contact 8b of the relay 8, the contact 13a of the defrosting timer 13 and the door of the refrigeration chamber switch 11 all connected in series. To the brushless motor 12 is connected the fan for forcefully circulating cold air from the evaporator 119 through the refrigeration and storage chambers. The defrosting timer 13 is disposed between the normally closed contact 8b of the relay 8 included in the thermostat 5 connected to the contact 13a of said defrosting timer 13 and one end of the A.C. source 1. Parallel connected to the defrosting timer 13 is a defrosting heater 15 through the contact 13b of said defrosting timer 13 and the defrosting thermostat 14 connected in series.

The brushless motor 12 comprises, as shown in FIG. 4, a drive circuit 26 consisting of a rotor section 21, position detecting coils 22a and 22b included in said rotor section 21 so as to detect the relative positions of the armature windings and the polarities of a magnetic field or rotor, a position detecting circuit 23 to which there are connected said coils 22a and 22b and a commutator circuit 25 for supplying current to the armature windings of the rotor section according to signals from said position detecting circuit 23; a rotation speed detector 27; and a speed control circuit 28.

The rotor section 21 is of a rotating magnetic field type and has three armature windings 31U, 31V and 31W arranged in the form of Y, the ends of said windings being connected to the commutator circuit 25. To the rotor 32 of the rotor section 21 is connected a position detecting rotating disk 33. About said rotating disk 33 are spatially arranged the position detecting coils 22a and 22b, which in turn are connected to the position detecting circuit 23.

This position detecting cirucit 23 mainly consists of NPN transistors 41 and 42 and PNP transistors 43, 44 and 45. The base of the NPN transistor 41 is connected through resistors 46 and 47 to the positive input terminal P and negative input terminal N of a power source respectively. The collector of said NPN transistor 41 is connected to the positive input terminal P through capacitors 48 and 49 connected in series. The emitter of said transistor 41 is connected through a resistor 50 to the negative input terminal N, and through a resistor 51 to the junction of the capacitors 48 and 49. The position detecting coil 22a is parallel connected to a series circuit of the capacitors 48 and 49. That is, the circuit of the NPN transistor 41 and position detecting coil 22a constitutes the so-called contactless switch for detection of the rotor position.

The base of the NPN transistor 42 is connected through resistors 52 and 53 to the positive and negative input terminals P and N of the power source respectively. The collector of said NPN transistor 42 is connected to the positive input terminal P through capacitors 54 and 55 connected in series. The emitter of said transistor 42 is connected through a resistor 56 to the negative input terminal N and through a resistor 57 to the junction of the capacitors 54 and 55. The position detecting coil 22b is parallel connected to the series circuit of the capacitors 54 and 55. Namely, the circuit of the NPN transistor 42 and the position detecting coil 22b constitutes the so-called contactless switch for detection of the rotor position.

The bases of the PNP transistors 43 and 44 are connected through resistors 60 and 61 to the collectors of the NPN transistors 41 and 42 respectively. The emitters of said PNP transistors 43, 44 and 45 are jointly connected through a resistor 62 to the positive terminal P of the power source. Across the emitters and collectors of said PNP transistors 43 and 44 are connected capacitors 63 and 64 respectively. The base of the PNP transistor 45 is connected through a resistor 65 to the positive input terminal P and through a resistor 66 to the negative terminal N. The collectors of the PNP transistors 43, 44 and 45 are connected to the commutator circuit 25 through resistors 67, 68 and 69 respectively.

The commutator circuit 25 mainly consists of NPN transistors 70, 71 and 72, the collectors of which are respectively connected to the armature windings 31U, 31V and 31W of the rotor section 21. The emitters of said NPN transistors 70, 71 and 72 are connected to the negative input terminal N of the power source. The bases of said transistors 70, 71 and 72 are connected to one end of the resistors 67, 68 and 69 of the position detecting circuit 23 respectively, and through resistors 73, 74 and 75 to said negative input terminal N.

The rotation speed detector 27 consists of, for example, diodes 81, 82 and 83, the anodes of which are connected to the armature windings 31U, 31V and 31W respectively, and the cathodes of which are connected together to form an output terminal 84. This output terminal 84 is connected to the speed control circuit 28.

This speed control circuit 28 mainly consists of NPN transistors 85, 86 and 87 and a PNP transistor 88. The collector of said NPN transistor 85 is connected to the positive input terminal P of the power source, and the emitter thereof is connected to the common junction of the armature windings 31U, 31V and 31W. The collector of said NPN transistor 86 is connected to said positive terminal P and the emitter thereof is connected to the base of said NPN transistor 85. The collector of the NPN transistor 87 is connected to the base of said NPN transistor 86, said junction being further connected to the positive input terminal P through a resistor 89. The emitter of the NPN transistor 87 is connected to the negative input terminal N of the power source and the base thereof is connected through a resistor 90 to said negative input terminal N and through a resistor 91 to the collector of said PNP transistor 88, the emitter of which is connected through a resistor 92 to the output terminal 84 of the position detector 27, and the base of which is connected through a band-operable rotation speed setter, for example, a variable resistor 29 to the contact of the emitter of the NPN transistor 85 with the junction of the armature windings 31U, 31V and 31W. The base of said PNP transistor 88 is also connected to the output terminal 84 of the speed detector 27 through a heat sensitive element, for example, a thermistor 30 and resistor 93 connected in series, as well as through a capacitor 94. The thermistor 30 is received in the storage to detect its temperature and consists of, for example, a negative type.

There will now be described the operation of a refrigerator constructed as described above according to this invention. Referring to the circuit of FIG. 1, when the storage chamber has a higher temperature than prescribed, the relay 8 of the thermostat 5 is in a deenergized state with its normally closed contact 8b and the contact 13a of the defrosting timer 13 kept closed. When, under this condition, the A.C. source 1 is closed, the motor 10 is supplied with alternating current to operate a compressor and the brushless motor 12 is supplied with direct current by the D.C. source circuit 4 to drive a fan. At this time, there passes alternating current through the A.C. circuit in a state overlapped by direct current, as shown in a broken line in FIG. 1, to cause the brushless motor 12 to be supplied with direct current. When the compressor is operated by the motor 10, the evaporator 119 is cooled and a fan is driven by the brushless motor 12 to cause cold air from the evaporator 119 to be forcefully circulated through the refrigeration and storage chambers to cool their interior.

When the defrosting timer 13 is actuated during refrigeration, its contact 13a is opened and its other contact 13b is closed, casing the compressor motor 10 and fan-driving brushless motor to be brought to rest. Upon the closure of said other contact 13b of the defrosting timer 13, its heater 15 is supplied with current to melt away frost deposited on the evaporator by the resulting heat. When the storage chamber temperature falls as a result of excess cooling to below a value preset for the thermostat 5, its relay 8 is energized to open its normally closed contact 8b, thereby stopping the compressor, fan and in consequence the cooling operation. Thereafter, the compressor motor 10 and fan-driving brushless motor 12 are again driven to continue refrigeration according to the operation of the thermostat 5 and defrosting timer 13.

There will now be described the operation of the brushless motor 12. When there is supplied, as shown in FIG. 3, direct current through the D.C. source circuit 4 across the positive and negative terminals of the power source, then the position detecting coils 22a and 22b and position detecting circuit 23 as shown in FIG. 4 detect the relative positions of the armature windings 31U, 31V and 31W and rotor 32 and supply the commutator circuit 25 with signals corresponding to said positions. Then the commutator circuit 25 shunts current in the armature windings 31U, 31V and 31W according to signals from said position detecting circuit 23. Namely, according to the relative positions of the armature windings 31U, 31V and 31W and rotor 30, any two of the transistors 43, 44 and 45 of the position detecting circuit 23 are tuuned on. As a result, those of the transistors 70, 71 and 72 of the commutator circuit 25, which correspond to the aforementioned actuated transistors are also rendered conducting. In any two of the armature windings 31U, 31V and 31W which are supplied with current, there arises an electromotive force and that derived from the action of said electromotive force and that derive from the winding of the rotor 32 gives rise to a driving torque, with the resultant rotation of the rotor 32. The transistors 70, 71 and 72 of the commutator circuit 25 are turned on in a prescribed order according to output signals from the position detecting circuit 23, thus effecting the normal operation of a refrigerator.

Where the brushless motor 12 is going to change its rotating speed due to variation in the source voltage, the speed detector 27 detects the rotating speed of said brushless motor 12 and the signal derived from said detection is fed back to the speed control circuit 28, thereby preserving the prescribed speed of the brushless motor 12. Rotation of the rotor 32 generates in the armature windings 31U, 31V and 31W a reverse electromotive force having a magnitude proportionate to the rotating speed of the rotor 32. Said reverse electromotive force is rectified by the diodes 81, 82 and 83 of the speed detector 27 and supplied to the speed control circuit 28. Accordingly, when the source voltage falls, the reverse electromotive force generated in the armature windings also decreases, resulting in the reduced output voltage from the speed detector 27. The voltage across the base and emitter of the transistor 88 drops, leading to declines in its base, as well as collector, current, and consequently the base and collector current of the transistor 87. As a result, the base current of the transistor 86 passing through the resistor 89 and in consequence that of the transistor 85 increase, permitting the passage of larger amounts of the collector current. The resulting impression of higher voltage on the armature windings 31U, 31V and 31W accelerates the rotating speed of the rotor, enabling the brushless motor 12 to be brought back to its original prescribed speed. When the source voltage rises, there occur reverse events to the previous case of voltage drop. Namely, the speed control circuit 28 so acts as to slow down the rotor rotation to restore the brushless motor 12 to its original preset rotating speed. As mentioned above, this invention enables the rotating speed of the brushless motor 12 and consequently the fan to be automatically controlled to the predetermined level, regardless of variations in the source voltage.

The invention further enables the rotating speed of the fan to be controlled according to variation in the refrigerator temperature. When the rfrigerator has a high temperature, the thermistor 30 has a smaller resistance, causing current to be shunted to the variable resistor 29 with the resultant decrease in the base current and in consequence collector current of the transistor 88, as well as in the base and collector current of the transistor 87. This leads to the increased base current of the transistor 86 through the resistor 89 and in consequence that of the transistor 85, permitting the passage of larger amounts of collector current. Accordingly, the armature windings 31U, 31V and 31W are impressed with higher voltage to accelerate the rotating speed of the brushless motor 12. When the storage chamber temperature falls, the thermistor 30 presents a greater resistance, resulting in the occurrence of reverse events to the previous case, thereby to decelerate the rotating speed of the brushless motor 12. Thus detection of the refrigerator temperature controls the rotating speed of the brushless motor 12. That is, detection of high refrigerator temperatures steps up the fan rotation to supply larger volumes of cold air for quick refrigeration. FIG. 3 presents the relationship of the refrigerator temperature and the number of rotations of the brushless motor 12.

There will now be described rapid cooling by manual operation. In this case the speed setter 29 is set high to cause the fan to rotate at increased speed for quick freezing. Said speed setter, or variable resistor 29 is manually operated to present a higher resistance. At this time, the base and collector currents of the transistor 88 decrease, eventually accelerating the rotating speed of the brushless motor through the same procedures as described above. Thus, quick rotation of the fan permits rapid cooling of the storage chamber. In addition to the above-mentioned object, the variable resistor 29 can be used to set the rotating speed of the brushless motor at a desired level while it is in normal operation.

The aforesaid arrangement enables, regardless of variations in the source voltage, the fan to be rotated at a prescribed rate which is used forcefully to circulate cold air through a refrigerator and also said fan rotation to be controlled according to refrigerator temperatures, thus realizing good forceful circulation of cold air through the refrigerator and in consequence its efficient cooling. Further, rapid cooling can be easily effected simply by setting the speed setter 29 at a high level for the quicker rotation of the fan. Since there is used a common D.C. source circuit for both thermostat 5 and brushless motor 12, the refrigerator of this invention is in simpler in arrangement and less expensive to that extent than the type wherein there are separately provided such D.C. source circuits. Moreover, according to this invention, while the thermostat 5 is operated, the brushless motor 12 remains unactuated, and while the thermostat 5 is kept inoperative, the brushless motor 12 is driven. That is, the refrigerator of the invention is worked by the so-called reciprocal mechanism. Therefore, the D.C. source circuit 4 is only required to withstand a load corresponding to the capacity of either of the thermostat 5 and brushless motor 12, whichever larger and consequently is allowed to have an appreciably small capacity.

With the foregoing embodiments, the thermostat 5 and brushless motor 12 were formed of transistors. Instead, said thermostat 5 and brushless motor 12 may consist of semiconductor switching elements such as thyristors, still obtaining the same results.

Further with said embodiments, the speed detector 27 comprised three diodes; the rotating speed of the rotor was detected by the reverse electromotive force generated in the armature windings 31U, 31V and 31W; and the detected signals were fed back to the speed control circuit 28. Instead, it is possible to detect the rotating speed of the rotor, for example, by a revolution counter and feed back the resulting signal to the speed control circuit 28.

What is claimed is:

1. In a refrigerator of the type including two compartments having separate access doors and operated at substantially different temperatures but having fluid communication therebetween, an evaporator located in one of said compartments for circulation of refrigerants through said evaporator a fan within said one compartment for positive circulation of air over said evaporator and through said compartments, the improvement which comprises:

a variable speed brushless D. C. motor for driving said fan, said motor consisting within said one compartment of a permanent magnet rotor connected to said fan, a disc on the shaft of said rotor, a pair of stationary position detecting coils adjacent said disc and the stationary y-connected winding surrounding said rotor; and exterior of said compartment, a rotor position sensing circuit connected to said position detecting coils, a commutation circuit connected to said armature winding, and a circuit connected to said armature winding for detecting and controlling the speed of said motor;

said speed control circuit being a constant voltage type having a first transistor constituting a detecting section for detecting variations in the source voltage between its base and emitter, a second transistor constituting a comparing section for comparing its collector current with a reference voltage, and a third transistor constituting a controlling section controlled by variations in output, particularly those in the collector current of the second transistor so as to control exciting current supplied to the system with which said speed control circuit is associated, said first, second and third transistors being connected in series;

whereby the rotation of said motor is controlled and the speed maintained with a minimum of heat transfer to said compartments.

2. The refrigerator according to claim 1 including a heat sensitive resistor connected between the base and emitter of the first transistor so as to adjust the rotation of a motor for driving a fan for control of the rotation of the latter by output signal from the speed control circuit according to variations in the refrigerator temperature.

3. The refrigerator according to claim 1 which further comprises a variable resistor connected between the base terminal of the first transistor and the output terminal of said speed control circuit and capable of being varied in resistance by manual operation so as to change the base voltage of said first transistor and accelerate the fan rotation for rapid refrigeration.

* * * * *